Dec. 22, 1953    H. OMSTED    2,663,267
SAFETY DEVICE FOR MONORAIL CARS
Filed Feb. 20, 1950
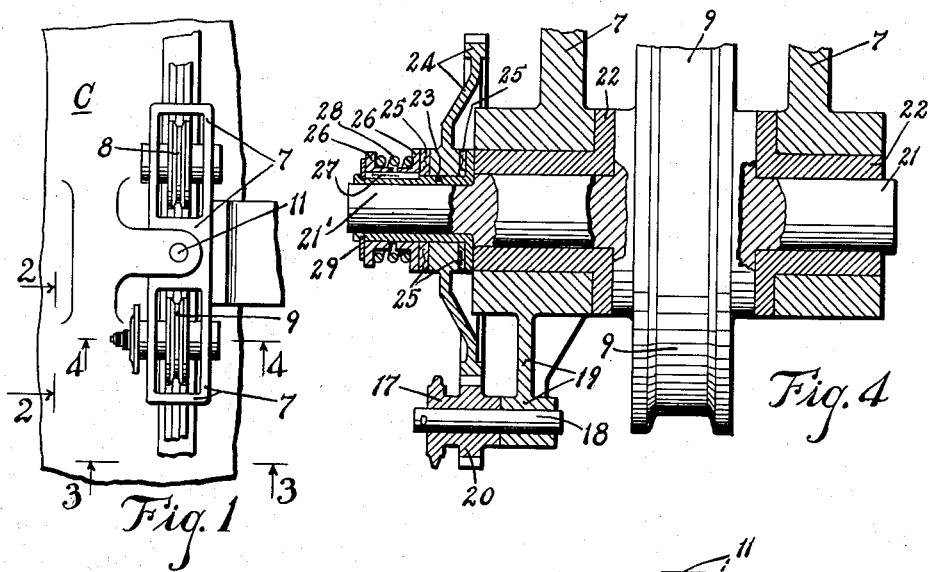
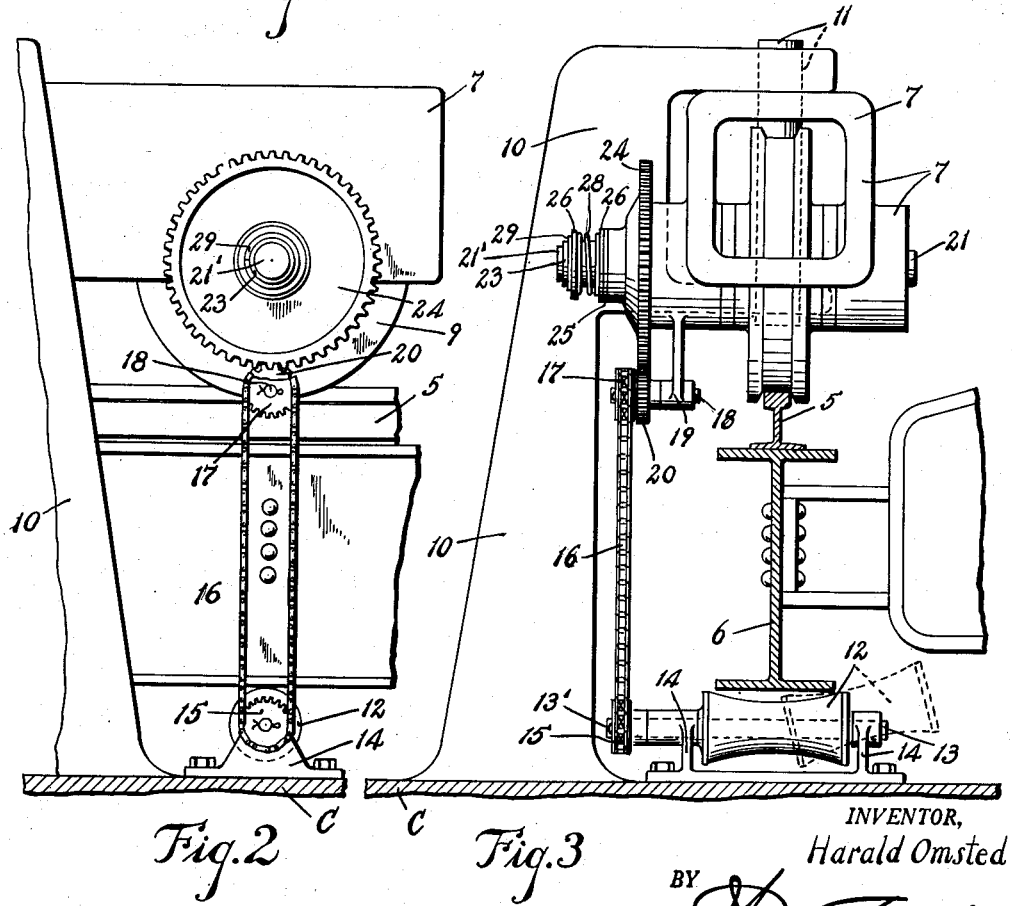
INVENTOR,
Harald Omsted
BY
ATTORNEY.

Patented Dec. 22, 1953

2,663,267

UNITED STATES PATENT OFFICE 2,663,267

SAFETY DEVICE FOR MONORAIL CARS

Harald Omsted, Pasadena, Calif., assignor to Monorail Engineering and Construction Corporation, Los Angeles, Calif.

Application February 20, 1950, Serial No. 145,149

6 Claims. (Cl. 105—153)

1

This invention relates to safety devices for monorail cars, and has particular reference to further improvements in the safety device shown in my pending application, Serial No. 137,595, filed January 9, 1950, now abandoned.

In that application, a device is shown for the prevention of a car running on a monorail being derailed, which device includes a roller element supported adjacent the under side of the rail support and so as to move against said rail support in case the carrying truck wheels should for any reason be caused to move away from the rail.

It is known that in monorail systems, the cars may move at great speed, and if, for any reason, a car should be caused to leave the rail on which it is running, the sudden engagement of the safety roller element with the under side of the rail support, if said roller element were not rotating, would cause sudden and greatly increased wear on the contacting surfaces, and might also cause abrupt jolting of the car and the passengers therein.

The principal object of this invention is to provide, in connection with a safety roller device of the character referred to, means for driving said safety roller element and for transmitting thereto a mean peripheral velocity which will be in step with the peripheral velocity of the truck-wheels carrying said car on the monorail.

Another object of the invention is to provide a simple, practical and efficient means for driving said safety roller element from one of the truck wheels from which the car is suspended under the rail on which said truck-wheels run.

In order to fully explain the invention, I have illustrated one practical embodiment thereof on the accompanying sheet of drawings, in which:

Figure 1 is a fragmentary plan view, looking down upon a truck from which the car is suspended;

Figure 2 is a fragmentary, enlarged end elevation of one of the truck wheels and showing the driving connections therefrom, as seen from line 2—2 on Fig. 1;

Figure 3 is a front elevation of said mechanism as seen from line 3—3 on Fig. 1, the rail and rail supporting beam being shown in section; and Figure 4 is a cross sectional view, enlarged, taken on line 4—4, Fig. 1, showing the mounting and the driving connections from one of the truck wheels.

Referring now in detail to the drawings, the carrier rail is designated 5, and its supporting beam is designated 6.

The carrier truck frame is designated 7, with its truck wheels 8 and 9.

2

A supporting yoke is designated 10, with its upper end pivotally connected, as at 11, on said truck frame, and its lower end is shown supporting a car carried thereby, suspended under said rail and rail support, said car being designated C.

Mounted on the top of said car, under the rail supporting beam 6, is a safety roller element, designated 12, said roller element being shown of spool-like form, and being mounted on a shaft 13, with bearings in a supporting bracket 14, mounted on the top of said car. The shaft 13 is shown extended, as at 13', and provided on its outer end with a sprocket 15, by means of which said roller element can be rotated, as by means of a sprocket chain 16, extended from another sprocket 17, on a jack shaft 18, in a bracket bearing therefor, designated 19, said shaft 18 also having thereon a spur pinion designated 20.

I will now describe one practical means for driving said sprocket, chain and safety roller from one of the truck wheels of the monorail carrier. It will be understood, of course, that many different means can be used for this purpose, but in the present showing, the truck wheel 9 has its shaft 21 secured thereto and turning in two bushings, as 22, 22, in the truck frame, designated as a whole 7, and shown in sectional view in Fig. 4. One end of said shaft 21 is extended in reduced diameter, as at 21', and provided with a sleeve 23, rigidly fixed thereto to turn therewith. A gear, designated 24, is mounted on said sleeve 23, between two friction discs or rings, designated 25, 25, said gear 24 and discs 25, 25 being free to rotate on said sleeve 23.

Two flanged collars, designated 26, 26, are keyed to said sleeve 23 by a key 27, but are free to slide longitudinally on said sleeve, said collars having therebetween a helical compression spring 28, designed to exert a predetermined force between said flanged collars.

Around the outer end of said shaft extension 21' is a stop ring, designated 29, sprung into an annular groove in said sleeve in a well known manner, to hold the outer collar 26 against outward movement, and to insure the full tension of spring 28 acting on the friction discs 25, 25, and the gear 24, for turning said gear.

It will be evident from the mechanism last described, that a friction clutch operating between the shaft 21', sleeve 23, and the gear 24, results. Under normal operating conditions, and with all the parts assembled as shown, the torque capacity of the friction clutch is sufficient to rotate the gear 24 as a unit with truck wheel 9. Under these conditions, the mean peripheral velocity of the safety roller element 12 will equal the peripheral velocity of truck wheel 9.

The jack shaft 18, together with the pinion 20, are introduced in order to bring about a reversal of rotation of the safety roller element 12, with respect to the rotation of truck wheel 9, as will be clear from the showing and the connections described.

It will be understood, of course, that under normal operating conditions, the monorail car may swing sidewise in pendulum fashion, this being particularly true while negotiating curves. Should an emergency arise wherein the safety roller contacts the beam 6, then the mean peripheral velocity of the roller would be correct only at the moment when the mean diameter of the roller was in contact with said beam. The friction clutch mechanism takes care of the varying roller diameters and will allow required compensation to take place.

I am aware that many different types of driving connections can be used for driving a safety roller element used as indicated in this application, and I do not, therefore, limit the invention to the details of construction and arrangement here shown for explanatory purposes, except as I may be limited by the hereto appended claims forming a part of this specification.

I claim:

1. In a monorail system, the combination with a rail and a rail support, of a wheel truck with traction wheels therefor, a car-supporting yoke having its upper end supported on said wheel truck, and having suspended from its lower end a car, whereby said car and said wheel truck move together along said rail, a safety device to prevent derailment of said wheel truck, including a roller element carried on said car immediately under said rail support, to engage said support to prevent derailment, a spur gear mounted on the axle of one of said traction wheels, spring tension means operating on said spur gear to hold it in frictional driving connection with said traction wheel, and driving connections from said spur gear to said roller element for driving it from said traction wheel, whereby when said roller element engages said rail support to prevent derailment, it will be turning with a yieldable friction drive in the line of drive.

2. A claim as set forth in claim 1 in which said car-supporting yoke is of C-form having its upper end pivotally supported on said wheel truck.

3. In a monorail system, the combination with a rail and a support therefor, of a carrier truck with traction wheels to run on said rail, a depending supporting member having its upper end connected with said truck and its lower end connected to and suspending a car under said rail support to move therewith along said rail, a safety device to prevent derailment of said carrier truck and including a roller element of spool-like form on the top of said car immediately under but not normally engaging said rail support to prevent derailment of said truck, driving connections from a traction wheel of said truck to said roller element for driving it from said traction wheel, and an automatically yieldable friction clutch driving means interposed in said driving connections between said traction wheel and said roller element.

4. A claim as set forth in claim 3 in which the depending supporting member has its upper end pivotally connected with said truck.

5. In a monorail system, the combination with a rail and a rail support, of a carrier truck having two traction wheels running on said rail, one in advance of the other, said rail being clear of supports on one side, a suspended supporting structure having its upper end connected in the top of said carrier truck and extending downwardly on the clear side of said rail, a car carried at the lower end of said suspended supporting structure, under said rail support, to move therewith along said rail, a safety device on said car immediately under said rail support to prevent derailment of said carrier truck and including a roller element movable to engage said rail support when raised by derailment movement, and driving connections from one of said traction wheels to said roller element for driving it with said traction wheel, with an automatically operable friction clutch forming a yieldable drive means in said driving connections to said roller element.

6. A claim as set forth in claim 5 in which the driving connections from a traction wheel to said roller element includes a spur gear, with friction means for driving it from one of said traction wheels, a spur pinion and sprocket wheel mounted to be driven from said spur gear, a sprocket wheel connected for driving said roller element, and a sprocket chain from one sprocket wheel to the other for driving said roller element as a safety element for engaging said rail support to prevent derailment of said carrier truck.

HARALD OMSTED.

References Cited in the file of this patent

UNITED STATES PATENTS

| Number | Name | Date |
|--------|------|------|
| 511,862 | Roberts | Jan. 2, 1894 |

FOREIGN PATENTS

| Number | Country | Date |
|--------|---------|------|
| 229,383 | Germany | Dec. 19, 1910 |
| 91,730 | Germany | Nov. 16, 1921 |
| 10,028 of 1895 | Great Britain | July 18, 1895 |
| 270,877 | Great Britain | May 19, 1927 |